July 28, 1942.   A. E. ANDERSON   2,291,199
ELECTRIC ARC WELDING TORCH
Filed April 10, 1941
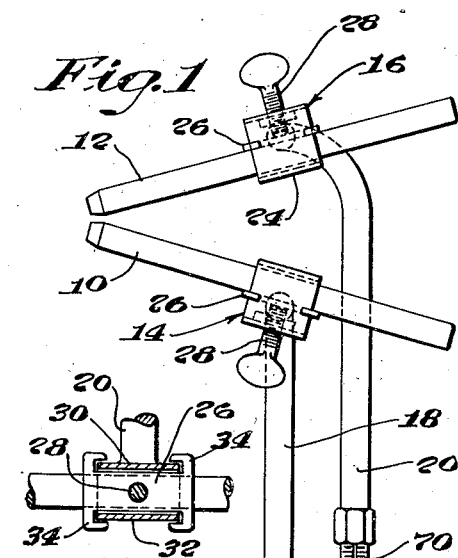
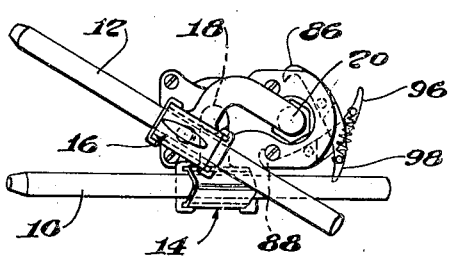
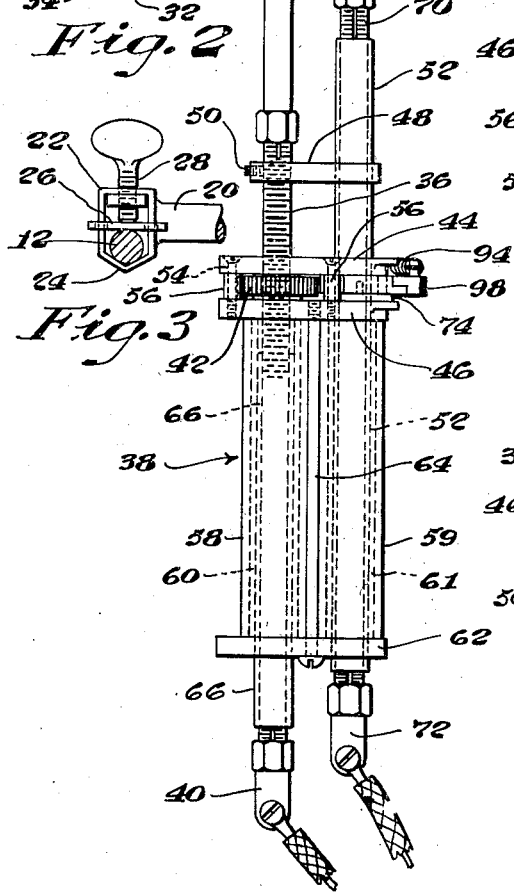
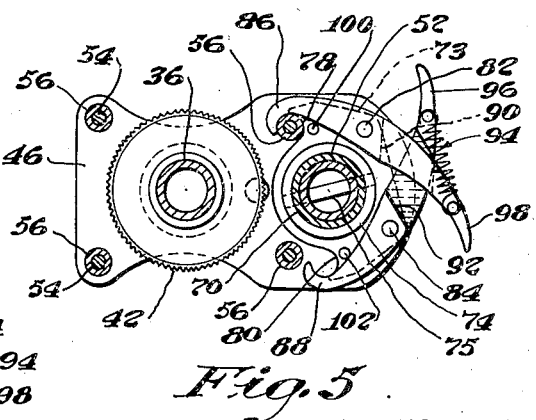
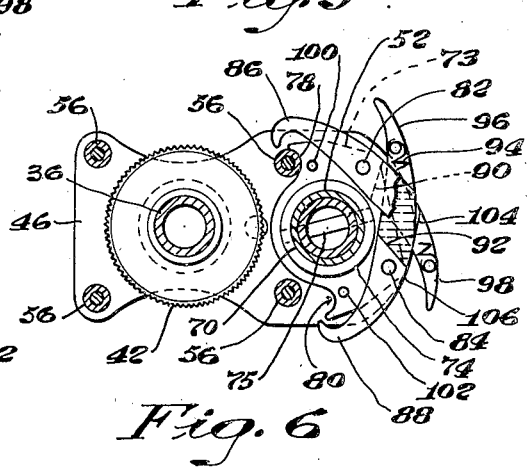
INVENTOR.
Alf E. Anderson
BY J. Stanley Churchill
atty.

Patented July 28, 1942

2,291,199

UNITED STATES PATENT OFFICE 2,291,199

ELECTRIC ARC WELDING TORCH

Alf E. Anderson, Milton, Mass.

Application April 10, 1941, Serial No. 387,889

7 Claims. (Cl. 219—14)

This invention relates to an electric arc welding torch.

The invention has for an object to provide a novel arc welding torch, also suitable for soldering, brazing, preheating, etc., of novel and improved construction by which the electrodes may be quickly and easily moved relative to each other into and out of operative arcing position while the operator holds the torch in one hand, in a novel, simple and positive manner.

With this general object in view and such others as may hereinafter appear, the invention consists in the electric arc welding torch and in the various structures, arrangements and combinations of parts hereinafter described and particularly defined in the claims at the end of this specification.

In the drawing illustrating the preferred embodiment of the invention, Fig. 1 is a side elevation of an electric arc welding torch embodying the present invention; Figs. 2 and 3 are enlarged detail views in plan and end elevations respectively illustrating the electrode holding members to be referred to; Fig. 4 is a plan view of the torch shown in Fig. 1 showing the electrodes moved to their inoperative position; and Figs. 5 and 6 are enlarged detail views of the locking and releasing mechanism in different positions of operation.

In general, the preferred embodiment of the invention contemplates an improved construction of an electric arc welding torch employing carbon electrodes mounted in a manner such as to permit them to be quickly separated a distance sufficient to interrupt the circuit and to break the arc when it is desired to discontinue the welding operation. In the illustrated embodiment of the invention, one of the electrodes, preferably the upper electrode, is clamped on the end of a rod rotatably mounted in a supporting handle and provision is made for manually rotating the rod through a predetermined angle into and out of operative position. Provision is also made for locking the rotatable rod in the position into which it has been moved so as to maintain the electrodes in either operative arcing position or in their inoperative non-arcing position. Provision is also made for adjusting the lower electrode with relation to the upper electrode in order to control the arc, preferably by means of an easily accessible nut, so that in operation the torch may be held and manipulated by one hand, leaving the other hand free to support the work or to feed the welding or brazing material. Another feature of the invention resides in the novel construction of the carbon electrode holding members which are adapted to hold carbons of different diameters and are arranged to positively clamp the carbon electrode in its longitudinally adjusted position.

Referring now to the drawing which illustrates the preferred embodiment of the invention, 10, 12 represent carbon electrodes supported in carbon holding members 14, 16 arranged to dispose the carbons at a suitable angle to each other to produce an efficient arc. The holding members 14, 16 are secured to the ends of metal rods 18, 20 respectively, and as shown in Figs. 2 and 3, each holding member comprises a hollow, substantially rectangular sleeve portion 22 having one wall 24 thereof V-shaped. The carbon is inserted in the sleeve and a movable plate member 26 is arranged to engage the cylindrical carbon to clamp the same between the plate and the V-shaped wall. A clamp screw 28 in the sleeve 22 bears against the plate 26 to effect the clamping operation. As herein shown, the side walls 30, 32 of the sleeve 22 are spaced sufficiently to permit a carbon of relatively large diameter to be inserted in the sleeve while the V-shaped wall in cooperation with the clamp plate 26 affords a three-point bearing to permit clamping of carbons of different and smaller diameters. The plate 26 is preferably provided with lugs 34 which embrace the side walls 30, 32 to prevent lateral displacement of the plates. Thus, it will be observed the carbons may be longitudinally adjusted in their holders to present the arcing ends of the carbons in operative arc producing relation.

As illustrated in Figs. 1 and 4, the metal rods 18, 20 are curved at their upper ends to present the carbons in alignment, one above the other, when they are in their operative position. Provision is made for vertically adjusting the rod 18 in order to vary the distance between the upper and lower electrodes. The rod 18 is clamped to the upper end of a hollow threaded metal member 36 which extends through and is vertically movable in a handle portion indicated generally at 36. The lower end of the member 36 is provided with an electrical connector 40 clamped thereon. The metal member 36 is provided with a knurled nut 42 arranged to be rotated by the thumb and forefinger of the hand holding the torch by the handle 38, in order to vertically adjust the carbon holding rod. The knurled nut 42 is supported between insulating plates 44, 46 mounted on the upper end of the handle to prevent axial movement of the nut. A tie member 48 secured by a set screw 50 to the member 36 is arranged to slidingly embrace a hard rubber sleeve 52 forming part of the upper carbon supporting unit, to be described. The tie member 48 operates to prevent rotary movement of the rod 18 when the nut 42 is rotated. As herein shown, the insulating plates 44, 46 are secured together by screws 54 and are maintained in spaced relation by spacing collars 56.

The handle portion 38 includes cylindrical insulated grips 58, 59 which are provided with sleeves of insulation or Bakelite sleeves 60, 61. The grips are maintained in assembled relation between the plate 46 and a lower plate 62 by an elongated screw 64. A sleeve of hard rubber or other insulation 66 fixed to the threaded member 36 slidingly engages the stationary sleeve 60, the latter thus forming an elongated bearing for the lower carbon electrode holding and adjusting unit.

Referring now to the upper carbon supporting unit, the rod 20 is clamped to an elongated metal threaded member 70 extended through the handle 38, the lower end being provided with an electrical connector 72. The sleeve 52 above referred to is secured to the member 70 and is rotatably mounted in the sleeve 61. Provision is made for rotating the sleeve and its associated mechanism in order to move the upper carbon 12 from an arcing position, that is, from a position in alignment with its cooperating carbon 10 to an inoperative or non-arcing position, as illustrated in Fig. 4. Referring now particularly to Figs. 5 and 6, the mechanism for manually rotating the upper carbon supporting unit includes a flanged collar 74 secured to the sleeve 52 and the member 70 by a pin 75. The collar 74 is retained between the plates 44, 46, thus preventing vertical movement of the unit. The flanged portion 73 of the collar 74 is provided with two hooked or cut-out portions 78, 80 arranged to engage either one of the other of the stationary spacing collars 56 adjacent the sleeve 52. The hooked portions 78, 80 serve as limiting stops, the engagement of the stop 78 with its cooperating collar 56 being arranged to align the upper electrode 12 with the lower electrode 10, and the opposing stop 80 being arranged to dispose the upper electrode in the position shown in Fig. 4.

Provision is made for automatically locking the carbon supporting unit in its moved position, and as herein shown, the flanged portion of the collar 74 is provided with two pivot pins 82, 84 upon which a pair of hooked levers 86, 88 are pivotally mounted. The hooked levers 86, 88 are slotted to permit relative movement, one lever 86, being provided with a slot 90 cut in its underside, and the other lever 88 being provided with a slot 92 cut in its upper surface so that the slots are disposed in overlapping arrangement. A common spring 94 connects the outer ends 96, 98 of the pivotal levers to urge the hooked ends 86, 88 inwardly. Stop pins 100, 102 extending upwardly from the flanged portion serve to limit the inward movement of the levers. It will be observed that the outer edge 104 of each slotted portion engages and cooperates with the outer curved surface 106 of the opposing pivoted lever so that in operation, when one lever is pressed to pivot the hooked portion outwardly, the opposing lever is simultaneously pivoted to move the opposing hooked portion outwardly.

From the description thus far, it will be observed that in operation, when the upper carbon supporting unit is moved, the hooked end of one of the pivoted levers engages a collar 56 and locks the unit in its moved position. As illustrated in Fig. 5, the mechanism is shown locked in its operative arcing position, the hooked lever 86 being engaged with its cooperating collar 56. It will be observed that locking engagement coincides with the engagement of the limiting stop 78 with the collar 56 so that the unit is positively held to prevent rotation in either direction. When it is desired to move the upper carbon supporting unit to its inoperative or non-arcing position, pressure with the thumb upon the outer end 96 of the lever will immediately release the hooked end 86 and simultaneously pivot the opposing hooked end 88 outwardly, as shown in Fig. 6. Continued pressure on the end 96 will rotate the unit until the stop 80 engages the collar 56 whereupon the pressure is released to permit the hooked end 88 to engage its collar 56. Conversely, it will be seen that pressure upon the outer end 96 will release hook 88, pivot the hook 86 and rotate the unit until the stop 78 engages the collar 56 whereupon pressure is released to permit hook 86 to engage the collar 56. With this construction it will be seen that when the unit is rotated, the electrode 12 is revolved about the axis of its supporting rod 20 to separate the carbons in a simple and rapid manner and locked in the position into which it has been moved.

From the above description it will be observed that the present electric arc welding torch is simple in construction and positive in operation and that the torch may be conveniently held in one hand and manipulated and adjusted with the same hand, making the operator's other hand available for manipulating the work. It will also be observed that the mechanism for rotating one carbon supporting unit with respect to the other enables the arc to be quickly broken when the welding operation is completed.

While the preferred embodiment of the invention has been herein illustrated and described, it will be understood that the invention may be embodied in other forms within the scope of the following claims.

Having thus described the invention, what is claimed is:

1. An electric torch for arc welding and similar operations having, in combination, a pair of electrode supporting members, a handle in which said supporting members are mounted in spaced and substantially parallel relation, one of said supporting members being mounted to rotate in said handle, means for rotating said one supporting member to move its electrode into and out of arcing position including a flanged collar fixed to said one supporting member, a stop member fixed in said handle and arranged to be engaged by said collar to limit the rotation thereof in one direction, and means for positively locking said one supporting member in the position into which it may be moved including a hooked lever pivotally mounted on said collar, said hooked lever being arranged to engage said stop member to prevent rotation in the other direction.

2. An electric torch for arc welding and similar operations having, in combination, a pair of electrode supporting members, a handle in which said supporting members are mounted in spaced and substantially parallel relation, one of said supporting members being mounted to rotate in said handle to move one electrode into and from arcing position, means for rotating said one supporting member into and out of operative position including a flanged collar fixed thereto, stop members fixed in said handle and arranged to be engaged by said collar to limit the movement thereof in both directions, corresponding to the arcing and non-arcing positions of the electrode, and means for positively locking said one supporting member in either of its moved positions including a pair of hooked levers pivotally mounted in said collar, each of said hooked levers being arranged to engage its corresponding stop member whereby to prevent rotation of said one supporting member in an opposing direction.

3. An electric torch for arc welding and similar operations having, in combination, a pair of electrode supporting members, a handle in which said supporting members are independently mounted in spaced and substantially parallel relation, said members being arranged to support the electrodes in axially spaced and converging relation and in substantial alignment when in operative position, one of said supporting members being arranged for vertical adjustment to vary the distance between the electrodes, the second supporting member being rotatably mounted in said handle, an adjusting screw supported in said handle for effecting said vertical adjustment, and means supported by said handle for rotating said second supporting member to separate the electrodes, said last named means including a collar fixed to said second supporting member, and stop members carried by said handle arranged to engage said collar to limit the movement of the supporting member in either direction whereby to dispose the electrode in operative and inoperative positions respectively.

4. An electric torch for arc welding and similar operations having, in combination, a pair of electrode supporting rods, a handle in which said supporting rods are mounted in spaced and substantially parallel relation, one of said rods being rotatably mounted in said handle, means carried by said one rod for rotating it to move its electrode into and out of arcing position, means carried by said handle arranged to engage said rotating means to limit the movement of said one rod in both directions corresponding to the arcing and non-arcing positions of the electrode, and means carried by said rotating means and cooperating with said limiting means for positively locking said one rod in either its arcing or non-arcing position.

5. An electric torch for arc welding and similar operations having, in combination, a pair of electrode supporting rods, a handle in which said supporting rods are mounted in spaced and substantially parallel relation, said rods being arranged to support the electrodes in axially spaced and in converging relation with respect to each other and in substantial alignment when in operative arcing position, means carried by one of said rods for rotating it whereby to rock its electrode laterally with respect to the axis of the rod and to effect rapid breaking of the arc, and latching mechanism carried by said one rod and engageable with said handle for positively locking said one rod in the position into which it is moved.

6. An electric torch for arc welding and similar operations having, in combination, a pair of electrode supporting rods, a handle in which said supporting rods are mounted in spaced and substantially parallel relation, one of said rods being rotatably mounted in said handle to effect movement of its electrode into and out of arcing position, stop means carried by said handle and cooperating with said one rod for limiting the movement thereof in both directions, and latching mechanism carried by said one rod and cooperating with said stop means for positively locking said one rod in both said positions.

7. An electric torch for arc welding and similar operations having, in combination, a pair of electrode supporting members, a handle in which said supporting members are mounted in spaced and substantially parallel relation, one of said supporting members being mounted to rotate in said handle to move one electrode into and from arcing position, means for rotating said one supporting member into and out of operative position including a flanged collar fixed thereto, stop members fixed in said handle and arranged to be engaged by said collar to limit the movement thereof in both directions corresponding to the arcing and non-arcing positions of the electrode, and means for positively locking said one supporting member in either of its moved positions including a pair of hooked levers pivotally mounted in said collar, each of said hooked levers being arranged to engage its corresponding stop member whereby to prevent rotation of said one supporting member in an opposing direction.

ALF E. ANDERSON.